United States Patent [19]

Higgs

[11] 4,176,284

[45] Nov. 27, 1979

[54] AUTOMOTIVE BATTERY POWER CIRCUIT BREAKER

[76] Inventor: Edward W. Higgs, 124 South 250 East, North Salt Lake City, Utah 84054

[21] Appl. No.: 864,485

[22] Filed: Dec. 27, 1977

[51] Int. Cl.$^2$ ........................ H01H 35/14; H02H 7/18

[52] U.S. Cl. ................................ 307/10 BP; 200/158; 335/2; 335/268; 339/224

[58] Field of Search ............... 307/10 BP; 335/2, 268, 335/274, 266; 339/34, 224; 200/158, 155 R

[56] References Cited

U.S. PATENT DOCUMENTS

| | | | |
|---|---|---|---|
| 1,615,106 | 1/1927 | Bethea | 307/10 BP X |
| 2,061,460 | 11/1936 | Freysinger et al. | 200/158 |
| 2,304,608 | 12/1942 | Smythe | 307/10 BP |
| 2,599,637 | 6/1952 | Hutton | 200/158 |
| 2,853,637 | 9/1958 | Karl | 307/10 BP |
| 3,459,954 | 8/1969 | Sgorbani | 307/10 BP |

*Primary Examiner*—Fred L. Braun

[57] ABSTRACT

An automotive electrical master circuit breaker which upon command opens the battery power circuit instantly and harmlessly at the battery cable (equivalent to removing cable at the battery terminal) and which upon command can be closed again instantly, and which disconnects battery power to all accessories except for a fuse protected small gage wire circuit that powers the master switch, and thus the master circuit breaker eliminates all risk of electrical fire, the significance of the design being that a battery cable cannot physically be removed in time to prevent destruction of the electrical system or to prevent fire, which function the master switch accomplishes. The invention uses technology long established in the identical functional arrangement, however never before applied to the present circuit breaker function.

3 Claims, 3 Drawing Figures

SECTION A A

SECTION A A

AUTOMOTIVE BATTERY POWER CIRCUIT BREAKER

BACKGROUND OF THE INVENTION

Automotive electrical cables are rigidly bolted to the battery terminals, making it literally impossible to remove them instantly, which removal is of utmost importance when an emergency arises such as an electrical short circuit, a fire, or even a stuck accessory like a horn. Also, the capability to cut off battery power quickly is of great convenience when performing certain repairs.

Electrical short circuits are a major cause of vehicle fires. Contrary to common belief, some circuits are not protected with fuses. For example, full battery power is usually carried by heavy gage wires through the firewall to the ignition switch and relay and to the voltage regulator continuously and without fuse protection, even when all accessories and switches are turned off. Power is cut to these locations only when a cable is removed from either battery terminal or when a circuit breaker like the present invention is activated. A short circuit or malfunction of the relay, regulator, or ignition switch is a major cause of electrical fires and total destruction of the vehicle electrical wiring. Even if the driver has proper tools, he could not remove the battery cable in time to prevent extensive wiring destruction and/or fire.

The battery disconnect must be instantaneous when a short occurs, and the present invention makes this possible. It permits instant power disconnect and reconnect with the movement of the ignition switch. Most drivers will want to open the circuit whenever the vehicle is unattended. Also, since the engine cannot be started without battery power, theft will be thwarted. Further, quick disconnect of battery power is a great convenience when certain mechanical repairs are being performed.

The primary purpose of the present invention is to provide a quick, reliable, and convenient master circuit breaker which is equivalent to removing a cable from one of the battery terminals.

Prior to this invention, conventional circuit breakers for motor vehicle battery power isolation from one master switch have not been feasible because the high amperage requirement of the starter motor would activate any conventional circuit breaker designed to protect the small amperage wiring of the accessory circuit.

The invention includes three circuit breaker designs: (1) the solenoid operated open and close system, (2) the solenoid operated open and close system having a backup provision manual actuation and (3) the manually operated system.

SUMMARY OF THE INVENTION

The specific embodiment of my invention comprises a master circuit breaker of three designs, any one of which when activated provides the equivalent result of removal of a cable from a battery terminal, thus isolating the battery power from the vehicle electrical system. The effect of two of the designs is instantaneous by a turn of the ignition switch.

This invention provides a major advancement in reducing vehicle fires and destruction of electrical wiring caused by electrical short circuits by providing the driver an immediate remedial action. He can now open the battery power circuit instantly without damage to any component when the need arises and close the circuit again upon command. The very critical but impossible task of removing a battery cable instantly when an emergency arises is now literally possible with the present invention. Without the circuit breaker considerable time is required to isolate battery power by removing a cable, even if proper tools are immediately available and wiring is destroyed before the task can be accomplished.

The only continuous power present when the solenoid operated design has opened the circuit is a small 16 gage wire which provides solenoid power and this line is protected with a fuse.

The present invention circumvents the difficult problem of providing protection to small amperage wiring (fuses) yet assuring adequate power to operate the high amperage starter motor. Power required by the starter motor would burn up the accessory wiring in less time than that needed to provide a normal start.

Three designs are described for achieving the circuit breaking function. These are the solenoid operated open and close system, the solenoid operated open and close system with a manual actuation provision, and the manual system.

A belleville type spring is used in the solenoid operated designs to lock the plunger in the commanded positions. An alternate method for accomplishing the hold requirement is a continuous service type solenoid coil design.

DESCRIPTION OF THE PREFERRED EMBODIMENT

Solenoid Operated Design

Installation of the battery power circuit breakers is similar for the open and close solenoid operated designs and the manual operated design.

Figure 1:
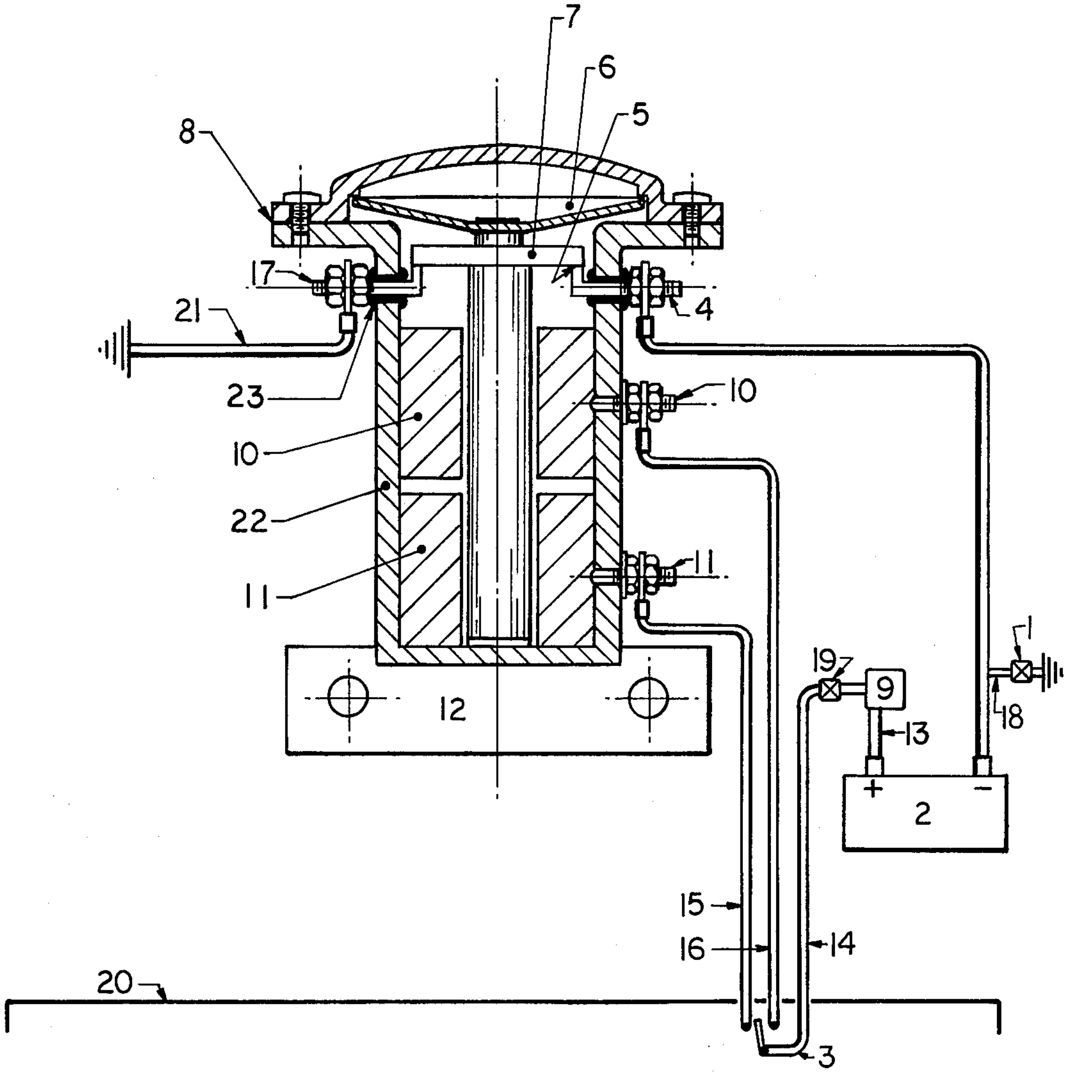
FIG. 1 is a schematic of the electrical circuitry and a design detail showing components and arrangement of the open and close solenoid operated design. The solenoid coils 10 and 11 could alternately be combined. A variation of the solenoid operated open and close design uses an external extension of the plunger 7 for manual actuation should the need arise.
Figure 2:
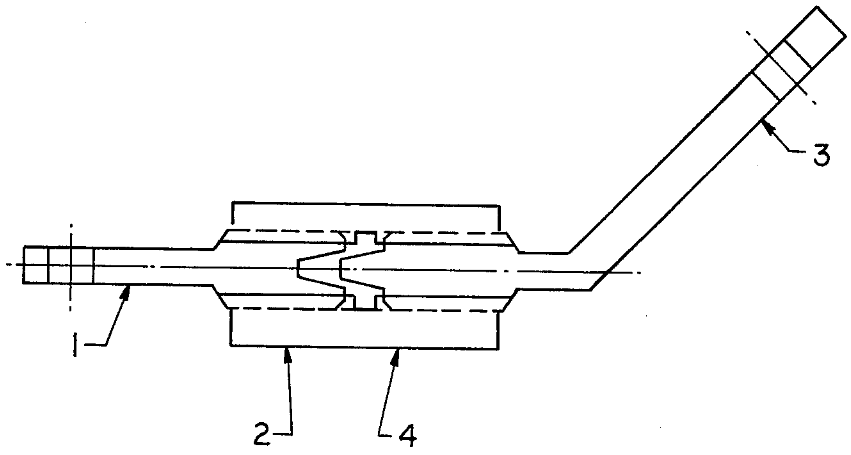
FIG. 2 is a design detail view of the hand or manually operated design.
Figure 3:
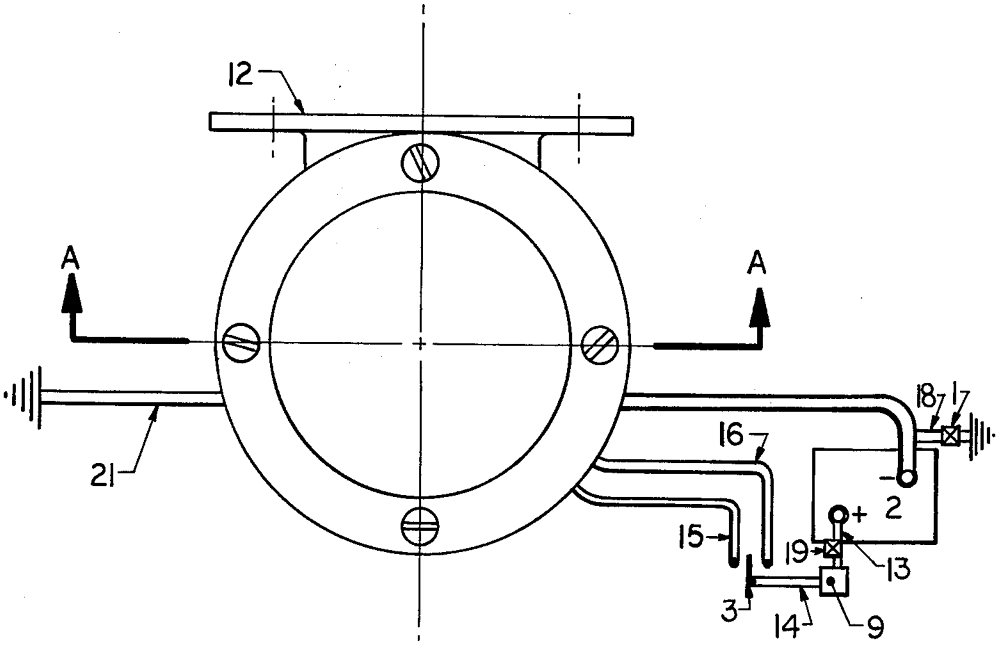
FIG. 3 is a plan view of the solenoid operated design which shows the cutting plane A—A that pertains to FIG. 1.

The preferred embodiment is achieved by removing the battery ground cable at the vehicle ground junction (usually bolted to the frame or engine block) and attaching the cable end to one of the large terminals of the circuit breaker solenoid. A second short cable is required to connect the second large terminal to the vehicle ground. FIG. 1 shows the open/close solenoid design. A variation of the open and close solenoid design uses an extension of the plunger 7 which extends through the solenoid body to permit manual actuation if needed.

A small ground wire 18 with a protecting fuse 1 is required which provides power for the solenoid 8 and for running continuous accessories such as the electric clock (not shown). Any possible short in this line is protected by the fuse 1 and 19.

The live power cable 13 from the battery 2 to the power relay 9 is not altered with the preferred ground cable attachment.

For solenoid control, a wire like 16 gage item 14 is routed through a fuse 19 and into the passenger compartment to a three way switch 3 like the ignition switch. Wires 15 and 16 are routed from the switch to each of the solenoid coil terminals 10 and 11.

In operation, energizing the opening solenoid 10 moves the plunger 7 upward against the belleville spring load 6 opening the contact points 5 thereby disconnecting terminal 4 from terminal 17. This event cuts all power from the battery 2 except for the small fuse protected solenoid power lead 14 and 18. Finally the belleville spring reverses load direction and holds the contact points 5 open. When the switch 3 is positioned to energize the closing coil 11, the plunger 7 moves downward against the belleville spring load 6, the spring load reverses and maintains a holding load on the points 5.

The plunger 7 is constructed of a suitable magnetic material like low carbon steel or iron in the area within the effective magnetic field of coils 10 and 11, such that maximum force can be exerted on the plunger 7 by the field of the opening coil 10 and the closing coil 11. The upper part of the plunger beyond the configuration for maximum force of coil 10 is constructed of a nonmagnetic metal which is not subject to being magnetized by the field of coil 10.

Coils 10 and 11 are wound in opposite directions such that the force imparted to the magnetized plunger is directed to open the circuit when coil 10 is energized and to close the circuit when coil 11 is energized.

The solenoid 8 is mounted at any convenient location in the engine compartment like on the fender well using the mounting provision 12.

Thus the driver can cause disconnect of the battery from the vehicle electrical system by operating a switch from the passenger compartment and close the battery power circuit again in like manner.

Manually Operated System

The preferred embodiment consists of installation of the battery power circuit breaker in the battery ground circuit similar to that shown in FIG. 1. The battery ground terminal is disconnected from the vehicle frame or engine block and connected to the straight short side of the battery power circuit breaker 1. The angled brackets attaches to the vehicle ground where the cable was removed or at some other convenient location that will provide an effective ground to the vehicle.

The preferred design consists of a non-conducting sleeve 2 open at both ends and having an internal thread at each end, one of which is right hand and the other a left hand thread. The internal threads receive the left hand and right hand male threads of the connecting terminals 1 and 3, such that rotation of the sleeve 2 brings the terminals 1 and 3 together or separates them depending on the direction sleeve 2 is rotated. Tapers on the ends of 1 and 3 increase contact pressure. A knurl 4 on the exterior of 2 is provided for gripping.

Materials for 1 and 3 are suitable metals like copper or brass alloys for good conductivity. The material for 2 is a structural like durez which will not electrically conduct between 1 and 3 when 1 and 3 are not in contact with each other.

Having described my invention, I claim:

1. A dual coil solenoid operated automotive battery power circuit disconnect master switch installed preferrably on the ground side of the battery and having a movable plunger with an integral contact ring and a belleville spring system, the contact ring being located such that disconnect or connect of battery power is effected due to its position with respect to the battery ground and vehicle ground terminal ends which extend through the solenoid body and are located within the inner cavity, and said solenoid having dual coils with windings in opposite circumferential direction such that the force imparted to the plunger due to current flow within the coils is in one direction for operation of one coil and in the opposite direction for current flow in the other coil, and each coil having a separate exterior terminal for attachment of a conductor lead from the vehicle ignition switch such that, depending on the selected position of the ignition switch be it clockwise or counterclockwise, one coil is energized to effect plunger movement for battery disconnect and the other coil is energized for battery connect, and which plunger has integral with it or acting on it a belleville spring system which is capable of holding the plunger in the open or closed positions so that continuous solenoid power is not required to maintain the plunger position, the plunger position being determined by the solenoid coil last energized by the operator manipulating the ignition switch and which master switch having additional terminals for battery ground and vehicle ground and a solenoid body having a mounting provision, and which master swtich when open provides the desired result that no short circuit is possible at any device or accessory and not even at the positive or power terminal of the battery itself.

2. A dual coil solenoid operated automotive battery power circuit disconnect master switch installed preferrably on the ground side of the battery and having a movable plunger with an integral contact ring and a belleville spring system, the contact ring being located such that disconnect or connect of battery power is effected due to its position with respect to the battery ground and vehicle ground terminal ends which extend through the solenoid body and are located within the inner cavity, and said solenoid having dual coils with windings in opposite circumferential direction such that the force imparted to the plunger due to current flow within the coils is in one direction for operation of one coil and in the opposite direction for current flow in the other coil, and each coil having a separate exterior terminal for attachment of a conductor lead from the vehicle ignition switch such that, depending on the selected position of the ignition switch be it clockwise or counterclockwise, one coil is energized to effect plunger movement for battery disconnect and the other coil is energized for battery connect, and which plunger has integral with it or acting on it a belleville spring system which is capable of holding the plunger in the open or closed positions so that continuous solenoid power is not required to maintain the plunger position, the plunger position being determined by the solenoid coil last energized by the operator manipulating the ignition switch and which master switch having additional terminals for battery ground and vehicle ground and a solenoid body having a mounting provision, and having a provision for an external access for manual operation which is achieved by an extension of the plunger that passes through an opening in the body, and which master switch when open provides the desired result that no short circuit is possible at any device or accessory and not even at the positive or power terminal of the battery itself.

3. An automotive battery power circuit breaker which disconnects the circuit at one of the battery cables equivalent to removing one of the cables from the battery terminal, and which is manually operated to break and restore electrical continuity across its terminals by using a non conductive sleeve which is open on both ends and which has a right hand internal thread at one end and a left hand internal thread at the other end, which thread configurations receive corresponding male threaded terminals which are brought into firm contact or are separated depending on which direction the non conducting sleeve is rotated, and the rigid mounting of said disconnect switch being provided by the bolted connection of one terminal to the vehicle ground such that a housing or closure for the switch is not required for mounting, and which switch consists of not more than 3 components.

* * * * *